United States Patent

[11] 3,614,405

[72] Inventors Goro Hamano
Osaka;
Sadamichi Someda, Kanagawa-ken, both of Japan

[21] Appl. No. 802,387
[22] Filed Feb. 26, 1969
[45] Patented Oct. 19, 1971
[73] Assignee Matsushita Electric Industrial Co., Ltd.
Kadoma, Osaka, Japan

[54] NUMBER ENTRY SYSTEM
3 Claims, 7 Drawing Figs.

[52] U.S. Cl. .......... 235/160, 235/159, 235/156
[51] Int. Cl. .......... G06f 3/02
[50] Field of Search .......... 235/61 DP, 160, 156, 159, 164, 165

[56] References Cited
UNITED STATES PATENTS

| | | | |
|---|---|---|---|
| 3,358,125 | 12/1967 | Rinaldi .......... | 235/92 |
| 3,375,356 | 3/1968 | Scuitto et al. .......... | 235/160 |
| 3,405,392 | 10/1968 | Milne et al. .......... | 235/156 X |

*Primary Examiner*—Eugene G. Botz
*Assistant Examiner*—James F. Gottman
*Attorney*—Wenderoth, Lind & Ponack

ABSTRACT: A number entry system for a digital data processor. The system has an input register for receiving input data therein, and an auxiliary register coupled to said input register primarily for use as a multiplier-quotient register for a multiplication or division operation and which contains no data to be processed during a number entry operation. The auxiliary register has a capacity for the same number of digits as said input register. Left-shifting means is coupled to said input register for shifting the contents of said input register left by one digit position whenever a new figure of an input number is detected during a number entry before the position of the decimal point of said input number is designated. Marker signal generating means is coupled to said auxiliary register for setting a marker signal into the "one's" position of said auxiliary register when the first figure of an input number is detected during number entry. Right-shifting means is coupled to said auxiliary register for shifting said marker signal in said auxiliary register right by one digit position whenever a new figure of an input number is detected during a number entry after the decimal point of said input number has been designated. Input circuit means is coupled to said input register for putting the input figure into the same digit position with said marker signal whenever a new figure of an input number is detected during number entry.

INVENTORS
GORO HAMANO
SADAMICHI SOMEDA

BY Wenderoth, Lind & Ponack
ATTORNEYS

INVENTORS
GORO HAMANO
SADAMICHI SOMEDA

BY Wenderoth, Lind & Ponack
ATTORNEYS

Δ : DECIMAL POINT

INVENTORS
GORO HAMANO
SADAMICHI SOMEDA

BY *Wenderoth, Lind & Ponack*
ATTORNEYS

INVENTORS
GORO HAMANO
SADAMICHI SOMEDA

BY Waindereth, Lind & Ponack
ATTORNEYS

NUMBER ENTRY SYSTEM

This invention relates to a digital data processor into which numbers are entered from an input system, and more particularly relates to means and a method of carrying out entry of numbers into a digital data processor, for example, setting numbers into an electronic desk calculator, by the use of a 10-key figure keyboard and setting a decimal point in a specified position by the means of decimal point setting means such as a decimal point selection switch.

A conventional electronic desk calculator into which numbers are set by the use of a 10-key figure keyboard does not fix the decimal point to the position specified by the means of decimal point setting means such as a decimal point selection switch when numbers are set into it. When numbers are set into such an electronic desk calculator, numbers are set into the input register in the position of the least significant digit after the contents of the input register has been left-shifted in accordance with the keyboard handling.

The position of the decimal point is tracked by a decimal point counter, which is cleared to zero prior to the number entry and which counts whenever a digit is sent from the keyboard after the decimal point key is depressed. In such a manner, the decimal point counter indicates the position of the decimal point, and does not necessarily agree with the decimal point position specified by means of a decimal point setting means such as a decimal point selection switch. Thereafter, and prior to the start of arithmetic operations such as addition, subtraction, multiplication, or division initiated by the corresponding instructions from the function keys, the numbers in the input register have to be normalized to make the decimal point position in the input register agree with the decimal point position specified by the decimal point setting means by shifting the input register and tracking the decimal point on the input register by the decimal point counter. Only then can the arithmetic operation be executed. During the normalization of the contents of the input register, overflow of the contents of the input register might occur by left-shifting the contents of the input register. On the other hand, when the numbers are set into the input register, overflow of the contents of the input register does not occur. Besides, such a calculator has to have both a decimal point counter and a controlling circuit and becomes complicated and expensive.

It is an object of this invention to provide a number entry system for a digital data processor such as an electronic desk calculator into which numbers are set by the use of a 10-key figure keyboard, while the decimal point is fixed in a position specified by the means of a decimal point setting means for easy handling and avoidance of misoperation.

It is another object of this invention to provide a number entry system for a digital data processor having a simple construction and into which numbers are set while a decimal point is being fixed in a specific position.

It is a further object of this invention to provide a number entry system for a digital data processor using a register as the means for specifying the figure entry position into the input register. Such a register is not commonly used for the number entry operation.

These and other objects will be readily apparent to those skilled in the art from the following specification and accompanying drawings wherein.

Figure 1:
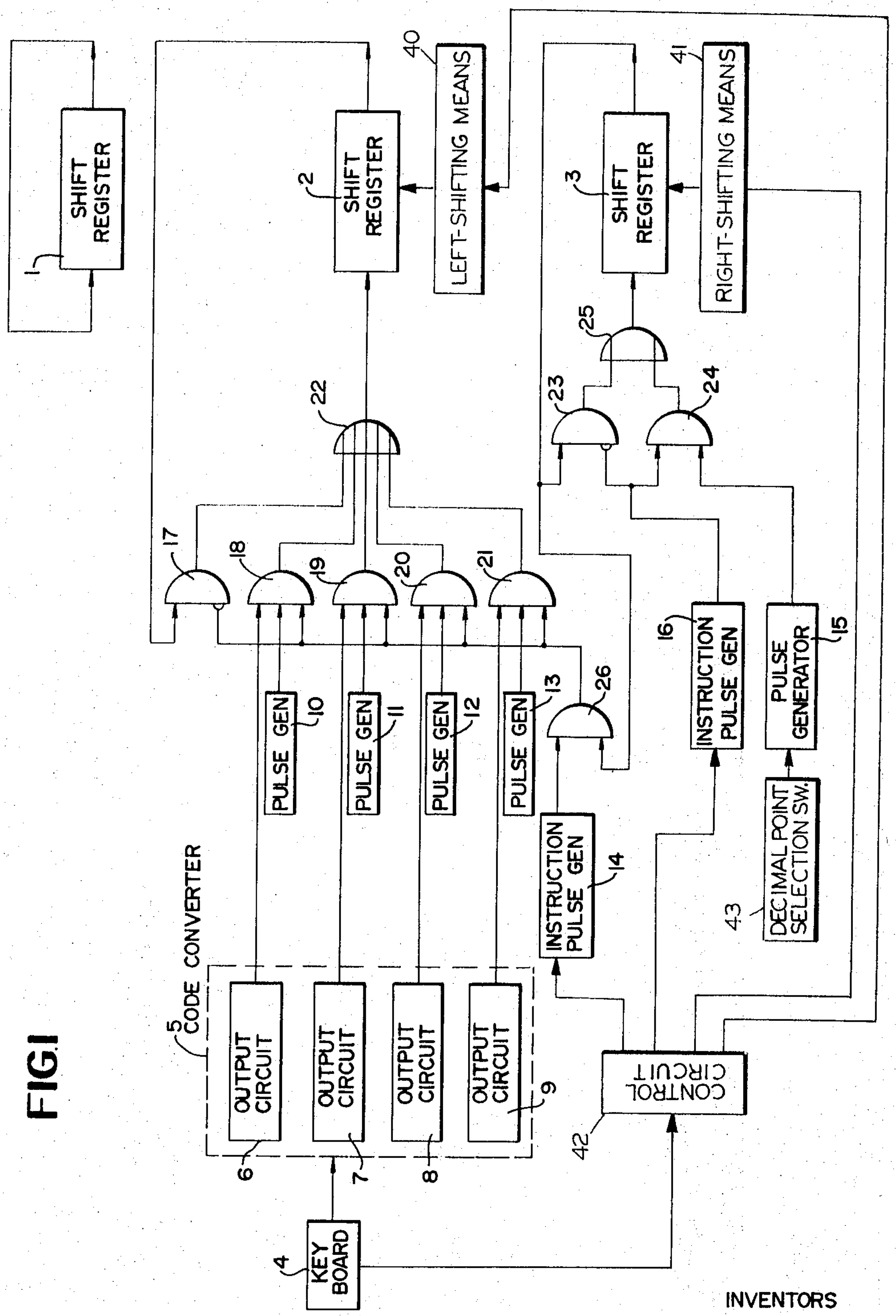
FIG. 1 is a block diagram of an electronic desk calculator in accordance with the invention, and having three registers, each of which has a 10-digit capacity.

Before proceeding with a detailed description of the present invention, the essential feature of the present invention will be explained with reference to FIG. 1.

A number entry system for a digital data processor according to the invention comprises an input register having a shift register 2 for putting input data into it, an auxiliary register having a shift register 3, left-shifting means 40 for shifting the contents of the input register to the left by one digit, marker signal generating means which is coupled to the auxiliary register and which consists of a pulse generator 15, an instruction pulse generator 16, an INHIBIT-gate 23, an AND-gate 24 and an OR-gate 25, all connected as shown in the figure, right-shifting means 41 for shifting a marker signal in the auxiliary register to the right by one digit, and input circuit means which is coupled to the input register and which consists of a keyboard 4, a code-converter 5, clock pulse generators 10, 11, 12, 13, and instruction pulse generator 14, an INHIBIT-gate 17, AND-gates 18, 19, 20, 21, 26, and an OR-gate 22, all connected as shown.

The auxiliary register is mainly used as a multiplier-quotient register in multiplication or division operations and contains no data to be processed during a number entry operation.

When the first figure of an input number is detected during number entry, the marker signal generating means sets a marker signal into the "one's" position of the auxiliary register. The input circuit means puts the input figure into the same digit position of the input register as the marker signal whenever a new figure of the input number is detected.

Before the decimal point of the input number is set in, the left-shifting means shifts the contents of the input register left by one digit position and after the decimal point of the input number is set in, the right-shifting means shifts the marker signal in the auxiliary register right by one digit position previous to the entry of the input figure into the input register. Thus, the input number is put into the input register and the decimal point position is fixed.

Figure 2:
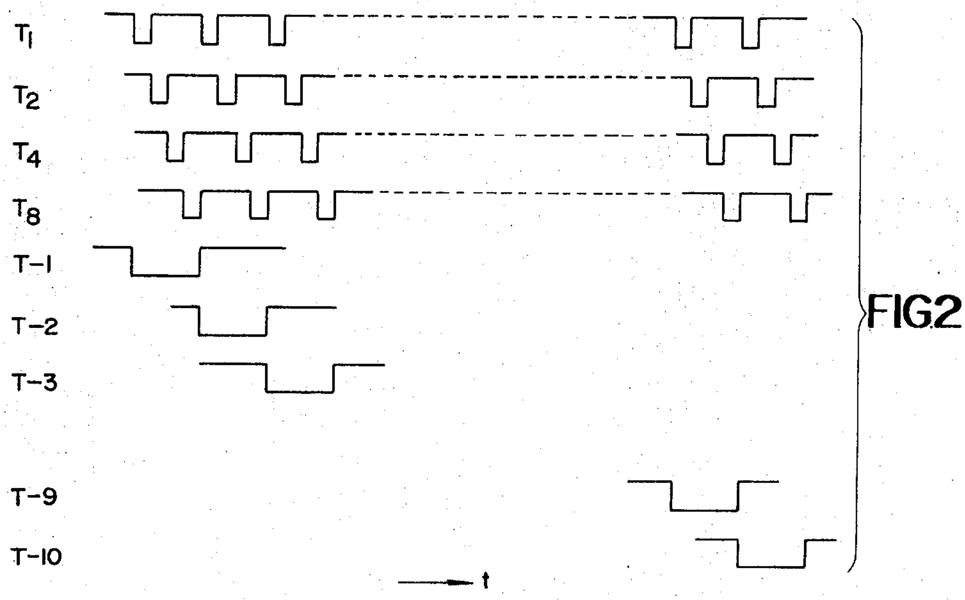
FIG. 2 is a diagram showing the clock pulses in the electronic desk calculator shown in FIG. 1.
Figure 5:
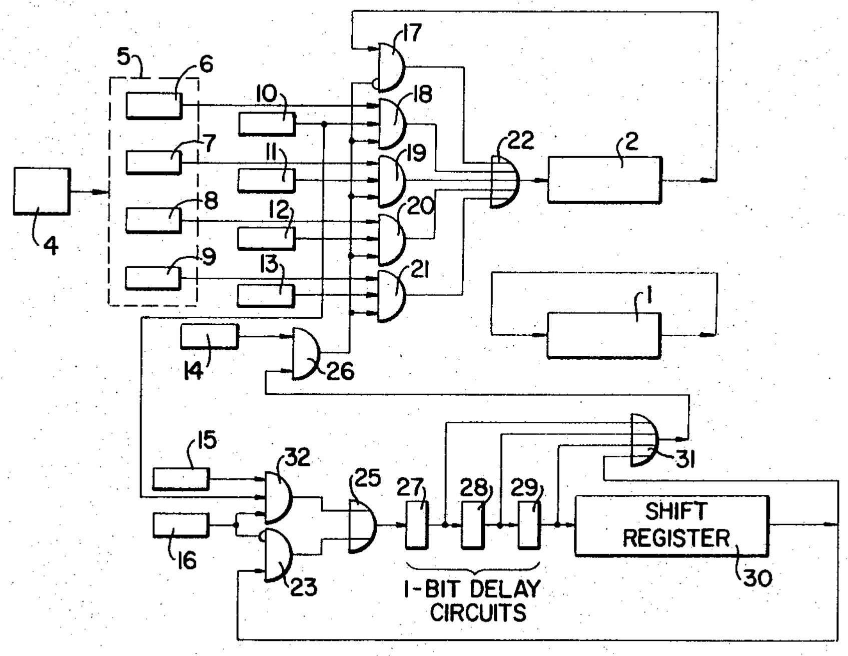
FIG. 5 is a block diagram of another electronic desk calculator in accordance with the invention, and having three registers, each of which has a 10-digit capacity.
Figure 6:
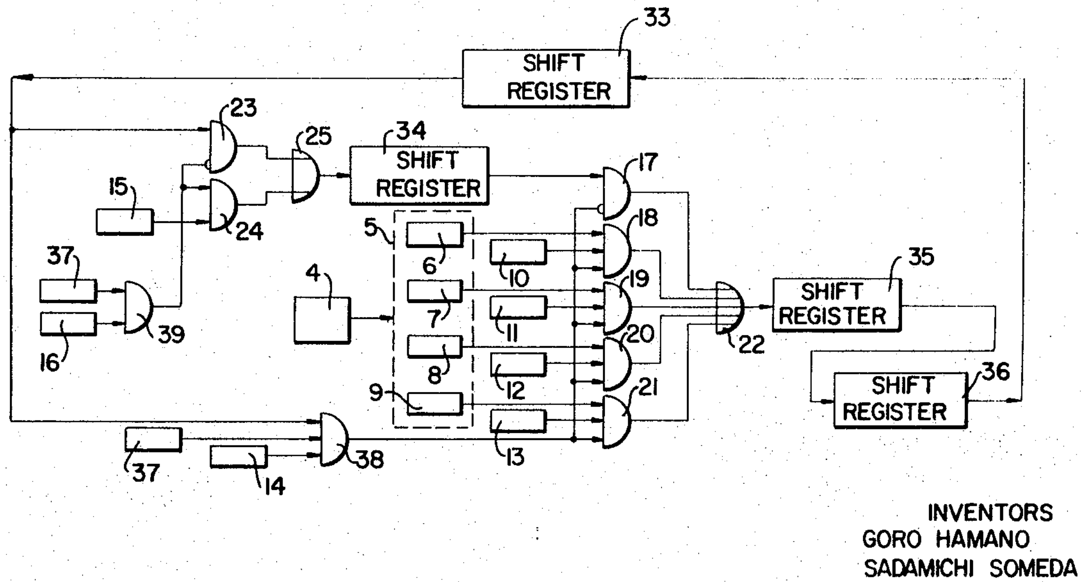
FIG. 6 is a block diagram of still another electronic desk calculator in accordance with the invention, and having three registers which are serially arranged by a time division method, each of said three registers having a 10-digit capacity.

FIG. 1, FIG. 2 and FIG. 6 show mainly registers and, in order to simplify them, do not show the adder, the complementer, the memory system, and so on which are not involved in the number entry operation directly. FIG. 5 and FIG. 6 do not show left-shifting means, right-shifting means, the control circuit and the decimal point selection switch for simplicity.

The following description will have reference, for convenience, to an electronic calculator having three registers, each of which has a 10-digit capacity and holds numbers in binary coded decimal (BCD) code.

Referring to FIG. 1, reference characters 1, 2 and 3, respectively, designate a 40-bit serial shift register which is normally a circulating register with input gate means. The first circulating register having the shift register 1 usually operates as an accumulator. The second circulating register having the shift register 2, mainly holds an addend, a subtrahend, a multiplicand or a divisor during an arithmetic operation, and is used as an input register during number entry. The third circulating register having the shift register 3 mainly holds a multiplier or a quotient during a multiplication or division operation. Information from the keyboard 4 for the entry of figures is stored, via the code converter 5, and gate means 18, 19, 20, 21 and 22, in the input register consisting of the shift register 2.

Left-shifting means 40 is a conventional means and is coupled to the second circulating register for shifting the contents of the second circulating register. Right-shifting means 41 is also a conventional means and is coupled to the third circulating register for shifting the marker signal in the third register. When the key switch of the keyboard 4 for the entry of figures is depressed, the control circuit 42 initiates the sequential control of the instruction pulse generators 14 and 16, left-shifting means 40 and right-shifting means 41 according to the flow chart shown in FIG. 3.

Information from the keyboard 4 for the entry of figures is converted into binary coded decimal (BCD) signals by the code converter 5. The output circuits 6, 7, 8 and 9 are provided with the output signal from the code converter 5 corresponding to the code "1," the code "2," the code "4," and the code "8," respectively. Each output signal from the code converter 5 enters the specified bit position of the second circulating register 2 used as an input register, through any of the AND-gates 18, 19, 20 and 21 and through the OR-gate 22. The figure specified by the actuation of keyboard 4 for figure entry is set into the input register in accordance with the opening of the AND-gates 18, 19, 20 and 21 when the input signals from the output circuits 6, 7, 8 and 9 of the code converter 5 are coincident with clock pulses $T_1$, $T_2$, $T_4$ and $T_8$, respectively, at the timing specified by the output signal of the AND-gate 26. Clock pulses $T_1$, $T_2$, $T_4$, and $T_8$ are output pulses of the $T_1$ clock pulse generator 10, the $T_2$ clock pulse generator 11, the $T_4$ clock pulse generator 12, and the $T_8$ clock pulse generator 13 corresponding to the codes "1," "2," "4" and "8," respectively. Only when the output signal of the AND-gate 26 is logically "1" is the figure specified by the keyboard 4 for figure entry set into the input register through any of the AND-gates 18, 19, 20 and 21, while the INHIBIT-gate 17 is closed and the signal recirculation in the second circulating register is stopped.

The third circulating register is normally used for a multiplier or a quotient for the operation of multiplication or division, but since this function is not necessary during figure entry, this register is used as explained in the following description during the figure setting.

When the keyboard 4 for figure entry specifies the most significant digit of the figure after an arithmetic operation, the instruction pulse generator 16 generates a signal which closes the INHIBIT-gate 23 so as to stop the signal recirculation in the third circulating register. At the same time a 4-bits "MARKER" signal such as "1 1 1 1" is set into the specified digit position of the third circulating register by means of the output signal of the pulse generator 15. Said pulse generator 15 specifies the one's digit position for figure entry into the input register corresponding to the decimal point position specified by the means for setting the decimal point, such as a decimal point selection switch 43. The AND-gate 24 opens when the output pulse of the pulse generator 15 is coincident with the output pulse of the instruction pulse generator 16.

As the length of the signal from the instruction pulse generator 16 is equal to the time necessary for the circulating registers to cycle one round, the third circulating register holds the 4-bits "MARKER" signal in the one's digit position after the operation described above. The operation for figure entry follows immediately the operation of the "MARKER" signal setting.

At first the instruction pulse generator 14 generates a control signal and sets the signal from the output circuits 6, 7, 8 and 9 of the code converter 5 into the input register. The digit position of the input register for figures entry is specified by means of the output signal from the AND-gate 26, which appears when the output pulse of the instruction pulse generator 14 is coincident with the 4-bits "MARKER" signal in the third circulating register.

The length of the signal from the instruction pulse generator 14 is equal to the time necessary for the circulating registers to cycle one round, and consequently, one figure is set into the one's digit position of the input register.

The following example shows the operation of figure entry when there are three digit positions to the right of the decimal point.

FIG. 2 shows the time relation between the clock pulses of the electronic desk calculator. The clock pulses T–1, T–2,..., T–10 specify the times of the digits of the circulating registers, respectively. For example, at the time of T–1, the input signals to the circulating registers correspond to the first digit counted from the least significant digit. Similarly, at the time of T–2, T–9 and T–10, they correspond to the second, the ninth and the 10th digit, respectively. It is assumed that before the operation of figure entry, the second register and the third register are cleared. Now numbers are set into the input register, in accordance with the flow chart shown in FIG. 3. The following description explains the operation of the entry of the number 12.345 as an example.

Figure 3:
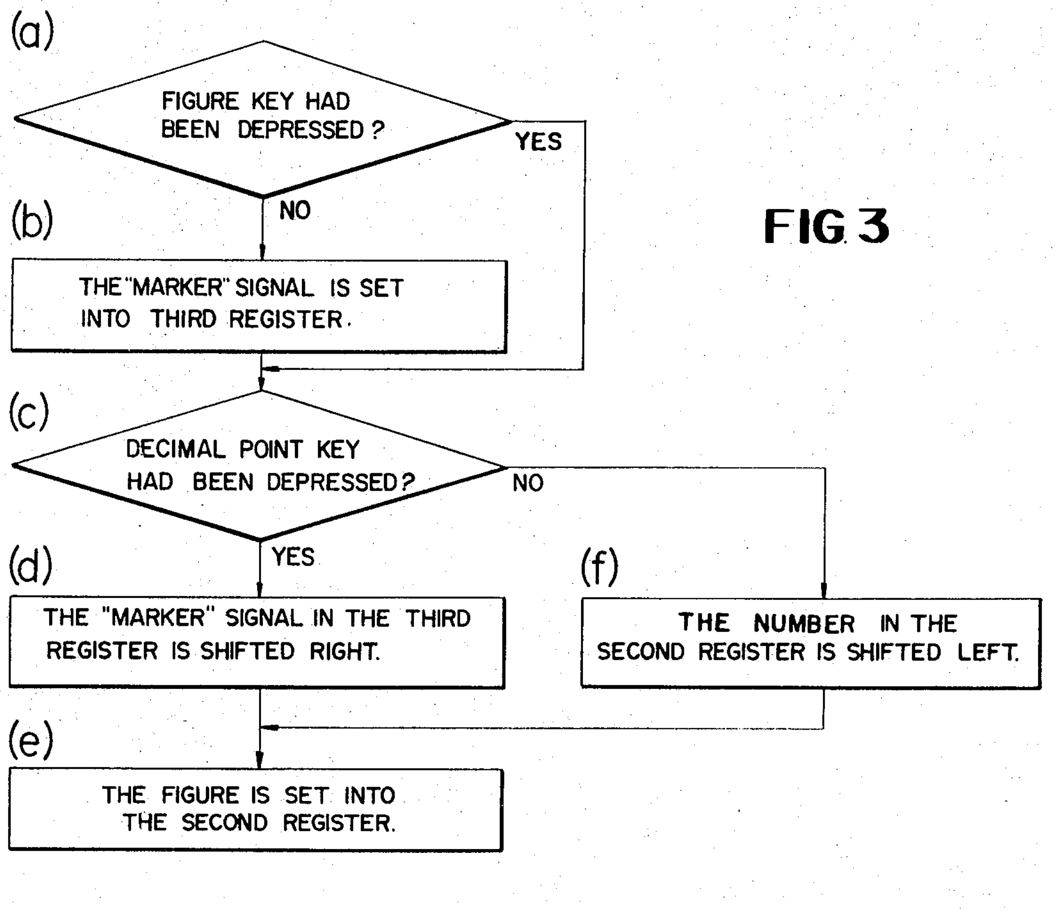
FIG. 3 is a flow chart for explaining the operations of the electronic desk calculator shown in FIG. 1.

When the key switch corresponding to the FIG. "1" is depressed, the actions in an order of (*a*) (*b*) (*c*) (*f*) and (*e*) shown in FIG. 3 are successively executed. In the action of step (*b*), the instruction pulse generator 16 generates the pulse and sets the output signal of pulse generator 15 specifying the digit position into the third circulating register through the AND-gate 24 and the OR-gate 25. The pulse generator 15 specifying digit position has the same pulse as the clock pulse T–4 So the third circulating register holds the "MARKER" signal having all "1" signals corresponding to all the positions of the code "1," the code "2, " the code "4" and the code "8" in the fourth digit position, that is, the one's digit position.

In the action step (*f*), the number in the second circulating register is left-shifted one digit position by the left-shifting means 40, but nothing occurs because the second register has been already cleared.

In the action step (*e*), the instruction pulse generator 14 generates a pulse, and the output signal from the AND-gate 26 becomes logically "1" only at the time T–4. Then, the FIG. "1" is set into the second circulating register in the fourth digit position, that is, the one's digit position through the AND-gate 18 at the time $T_1$ of T–4 by means of the output signal from the output circuit 6 of the code converter 5. At the same time, the INHIBIT-gate 17 is closed and the signal recirculation of the second circulating register is stopped by the output signal from the AND-gate 26. (cf. FIG. 4 (A))

When the key switch corresponding to the FIG. "2" is depressed, the actions in an order of (*a*) (*c*) (*f*) and (*e*) shown in FIG. 3 are successively executed.

Figure 4:
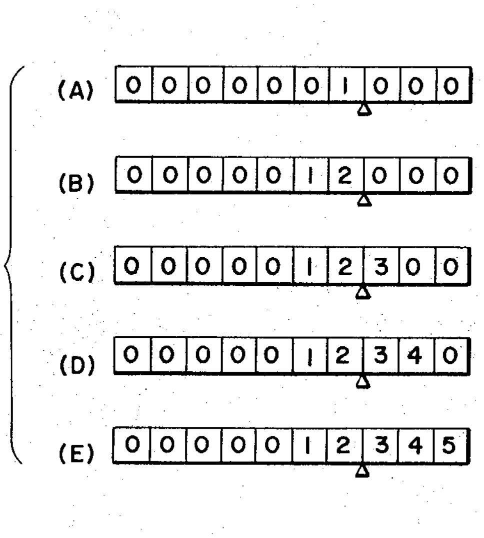
FIG. 4 is a diagram showing the numbers in the input register for aiding an explanation of the operation of the electronic desk calculator shown in FIG. 1.

In the action step (*f*), the number in the second circulating register is left-shifted one digit position and in the action step (*e*) the FIG. "2" is set into the second circulating register in the fourth digit position, that is, the one's digit position through the AND-gate 19, in a way as previously described (cf. FIG. 4 (B)).

When the key switch corresponding to the FIG. "3" is depressed after the depression of the decimal point key, the actions in an order of (*a*) (*c*) (*d*) and (*e*) shown in FIG. 3 are successively executed. In the action step (*d*) the "MARKER" signal in the third circulating register is right-shifted one digit position by the right-shifting means 41. Therefore in the action step (*e*), the FIG. "3" is set into the second circulating register in the third digit position, that is, the one-tenth digit position through the AND-gate 18 and 19, because the output signal from the AND-gate 26 becomes logically "1" only at the time of T–3 (cf. FIG. 4 (C)). Similarly, when the key switch corresponding to the FIGS. "4" and "5" are depressed, the FIGS. "4" and "5" are set into the input register in the proper position (cf. FIGS. 4 (D) (E)).

As the result of the operation described above, the input register is full of significant digits which are on the right side of the decimal point. So it is preferable that the succeeding operation of a figure key does not disturb the contents of the input register. This can be automatically accomplished without using a controlling circuit as follows in accordance with the invention. After the FIG. "5" enters the input register, the "MARKER" signal is on the least significant digit in the third register.

When any of the figure keys is depressed after the entry of FIG. "5" the "MARKER" signal on the third register is right-shifted away from the first digit position in the action step (*d*).

This operation automatically clears the "MARKER" signal from the third register; no more figures can enter after the entry of FIG. "5" and the FIG. "5 " in the first digit position can not be disturbed.

Referring to the FIG. 5, 1-bit delay circuits 27, 28 and 29, and a 37-bit serial shaft register 30 are connected in series and form a 40-bit serial shift register equivalent to the third register including a 40-bit shift register 3 shown in FIG. 1.

When the keyboard 4 for figure entry specifies the first figure, the instruction pulse generator 16 generates a pulse, closes the INHIBIT-gate 23, and then stops the signal recirculation in the third register. At the same time, the "MARKER" signal having only "1" corresponding to the code "1," is set into the specified digit position of the third register by means of the input pulse from the pulse generator 15. This pulse generator 15 specifies the digit position for figure entry into the input register having shift register 2, corresponding to the decimal point position specified by the means for setting the decimal point, such as a decimal point selection switch. The AND-gate 32 opens when the output pulse from the pulse generator 15 is coincident with the clock pulse $T_1$ of the $T_1$ clock pulse generator 10 by means of the control of the output pulse from the instruction pulse generator 16. Then the action for figure entry proceeds and the instruction pulse generator 14 operates. The digit position of the input register for figure entry is specified by means of the output signal of the AND-gate 26 when the output pulse of the instruction pulse generator 14 is coincident with the output signal of the OR-gate 31.

The output signal of the OR-gate 31 becomes logically "1" whenever any of the output signals of the 1-bit delay circuits 27, 28 and 29 and the output signal of the 37-bit shift register 30 is logically "1." Thus the digit position of the figure entry into the input register specified by the output signal of the OR-gate 31 corresponding to the digit timing when the circulating register having the 1-bit delay circuits 27, 28 and 29, and the 37-bit shift register holds the "MARKER" signal "1."

The other operations are similar to the operation of the calculator shown in FIG. 1.

Referring to FIG. 6, the output signal of the 108-bit serial shift register 33 is fed to the 4-bit serial shift register 34 through the INHIBIT-gate 23 and the Or-gate 25. The output signal of the 4-bit shift register 34 is fed to the 4-bit serial shift registers 35, 36, in succession, through the INHIBIT-gate 17 and the OR-gate 22. The output signal of the 4-bit shift register 36 is fed to the input terminal of the 108-bit shift register 33 and they thus form a 120-bit circulating register.

Figure 7:
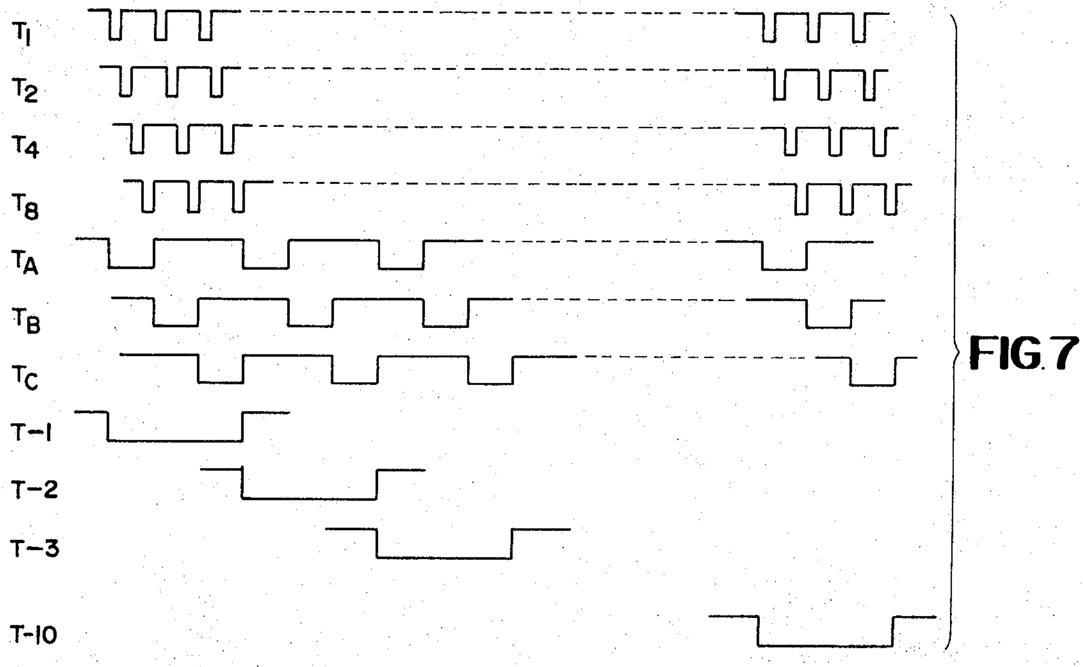
FIG. 7 is a diagram showing the clock pulses of the electronic desk calculator shown in FIG. 6.

Referring to FIG. 7, $T_1$, $T_2$, $T_4$ and $T_8$ are the clock pulses specifying the timing of the output signals from the 108-bit shift register 33 correspondingly in accordance with the code "1," the code "2," the code "4" and the code "8," respectively. $T_A$, $T_B$, and $T_C$ are the clock pulses specifying the timing of the output signals of the 108-bits shift register 33 correspondingly in accordance with the contents of the first register, the second register and the third register, respectively. And, T–1, T–2, ...., T–10 are the clock pulses specifying the timing of the output signals of the 108-bit shift register 33 correspondingly in accordance with the first digit, the second digit ... the 10th digit counted from the least significant digit, respectively.

As shown in the above description, the 120-bit circulating register has the three registers arranged in the order of bit, in time division order of registers and in order of digits. The first register usually operates as an accumulator, the second register mainly holds a multiplicand or a divisor and is used as an input register. The third register mainly holds a multiplier or a quotient.

In FIG. 6, the three 4-bit shift registers 34, 35 and 36 provide the means for easy right-shifting of the contents of the register, and are not involved directly in the present invention.

The circulating register shown in FIG. 6 includes three circulating registers corresponding to those shown in FIG. 1. As the three registers are arranged in time division order in the 120-bit circulating register, the output signal of the AND-gate 39 is used as an instruction pulse specifying the third register, together with the output signal of the instruction pulse generator 16 and the output pulse of the $T_C$ clock pulse generator 37, in order to set the "MARKER" signal in the specified digit position of the third register.

Similarly, the digit position of the figure setting into the second register is decided by detecting the "MARKER" signal in the third register by means of the AND-gate 38 instead of the AND-gate 26 shown in FIG. 1 when the output signal of the 108-bit shift register 33 is coincident in time with the output pulse $T_C$ of the $T_C$ clock pulse generator 37, by controlling of the output pulse of the instruction pulse generator 14.

The other operations are the same as those of the calculator shown in FIG. 1.

As mentioned above, the digital data processor having a simple construction in accordance with the invention facilitates the number entry by fixing the decimal point position. It is not necessary to shift the contents of the input register in advance of the elementary arithmetic operation. Therefore, overflow of contents of the input register can be avoided.

The electronic desk calculator according to the invention can be easily handled and is free from misoperation.

It will be understood that the invention is not to be limited to the exact construction shown and described, but that various changes and modifications may be made without departing from the spirit and scope of the invention, as defined in the appended claims.

We claim:

1. A number entry system for a digital data processor, comprising an input register for putting an input number into said data processor;

an auxiliary register for holding a marker signal during a number entry operation, said auxiliary register having a capacity for the same number of digits as said input register;

left-shifting means coupled to said input register for shifting the contents of said input register left by one digit position;

decimal point setting means coupled to said auxiliary register for specifying a desired decimal point position;

marker signal generating means coupled to said auxiliary register for setting a marker signal into the "one's" digit position of said auxiliary register corresponding to the decimal point position specified by the decimal point setting means;

right-shifting means coupled to said auxiliary register for shifting said marker signal in said auxiliary register right by one digit position;

input circuit means coupled to said input register for putting an input figure of the input member into the same digit position as said marker signal in said auxiliary register; and control circuit means coupled to said left-shifting means, said marker signal generating means, said right-shifting means and said input circuit means and being responsive to said left-shifting means, said marker generating means, said right-shifting means and said input circuit means when the first figure of an input number is detected during a number entry operation for operating said marker signal generating means to set the marker signal into the "one's" digit position of said auxiliary register, and when a new figure of an input number is detected and before the decimal point of the input number is set in, for operating said left-shifting means to shift the contents of said input register left by one digit position, after which said input circuit means puts the input figure into the same digit position of said input register with said marker signal, and after the decimal point of the input number is set in, for operating said right-shifting means to shift said marker signal in said auxiliary register right by one digit position, after which said input circuit means puts the input figure into the same digit position of said input register with said marker signal, whereby the input number is put into said register and the decimal point position is fixed.

2. A number entry system for a digital data processor as claimed in claim 1 in which both said input register and said auxiliary resistor are circulating types and each includes a circulating register and a recirculation control circuit; and said input circuit means is coupled to said input register and to the output of said auxiliary register for putting the input figure into the digit position corresponding to the marker signal at the time when said marker signal appears at the output terminal of said auxiliary register whenever a new figure of an input number is detected during number entry.

3. A number entry system for a digital data processor as claimed in claim 1 in which said input register and said auxiliary register are combined into a circulating type circuit which comprises a circulating register and a recirculation control circuit and is in a time division operation wherein each digit in said input register appears at the output terminal of said circulating register figure or precedently to the same digit position in said auxiliary register; and said input circuit means puts the input figure into the digit position corresponding to said marker signal whenever a new figure of input number is detected during number entry.